Aug. 27, 1929.　　　C. V. BOYS　　　1,726,140
RECORDING GAS CALORIMETER
Filed Jan. 27, 1921　　8 Sheets-Sheet 5
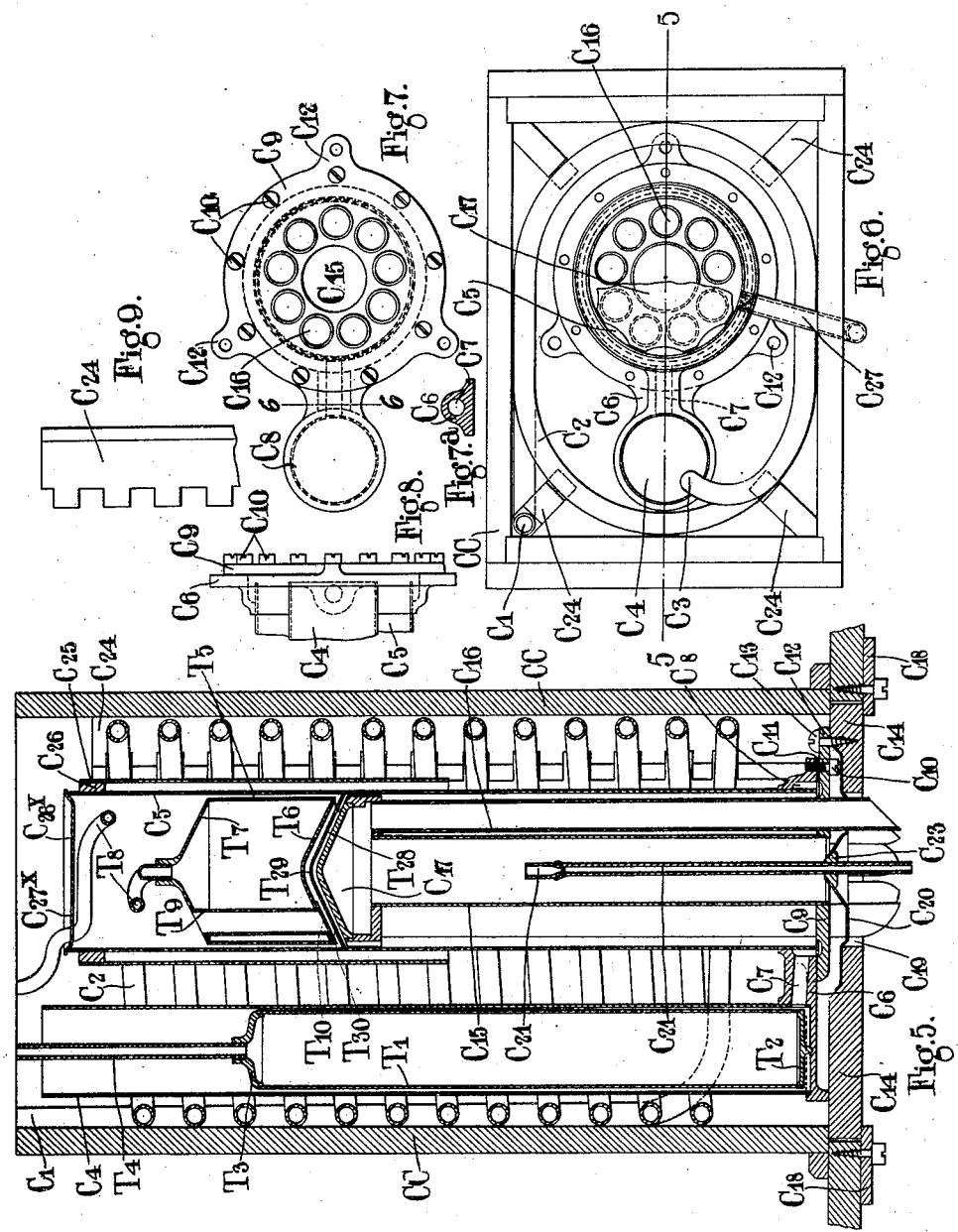
Inventor
C. V. Boys,
By Marks & Clerk
Attys.

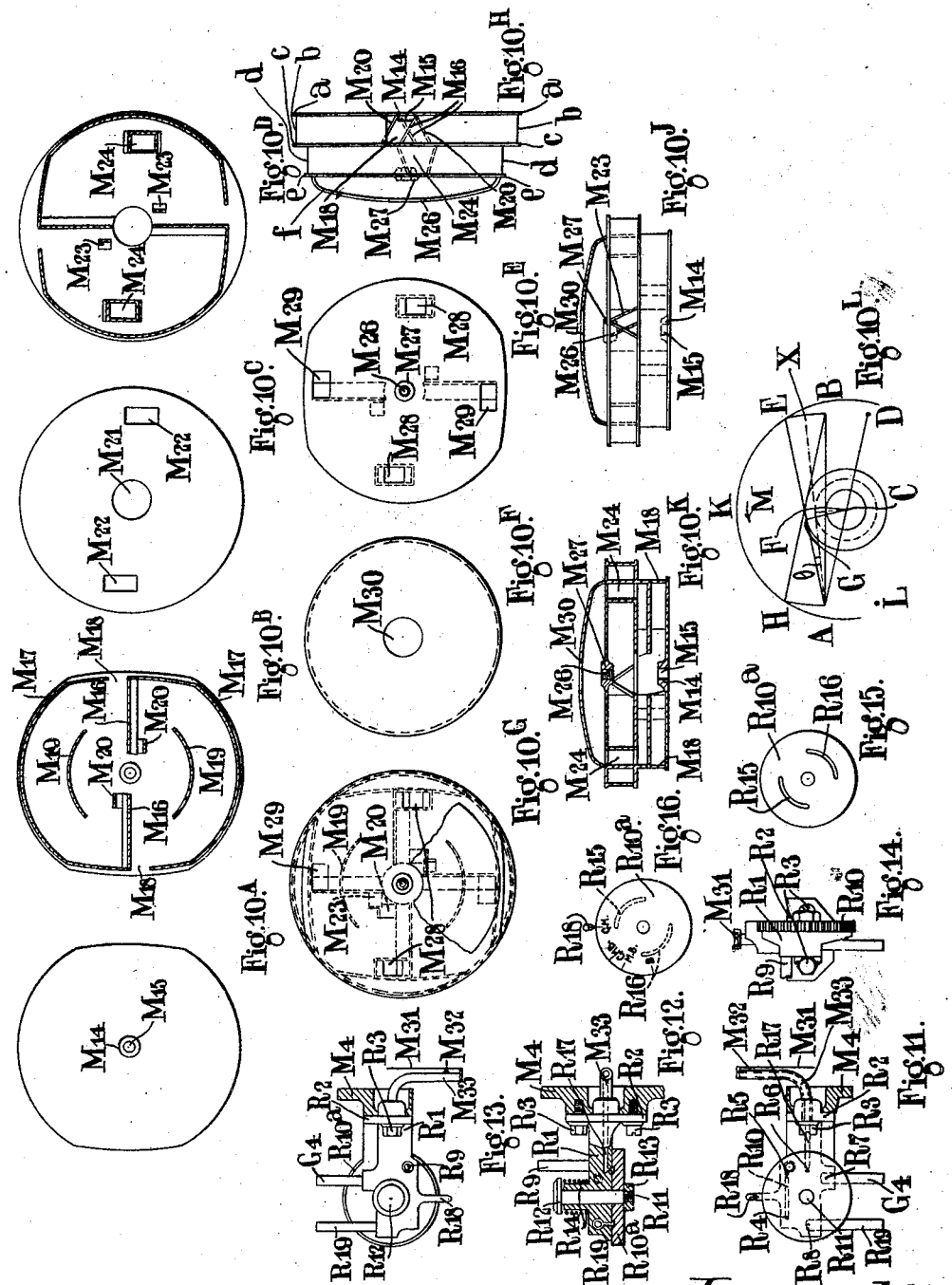

Aug. 27, 1929.                    C. V. BOYS                    1,726,140
                           RECORDING GAS CALORIMETER
                    Filed Jan. 27, 1921      8 Sheets-Sheet 7

Inventor
C. V. Boys,
By Marks & Clerk
Attys.

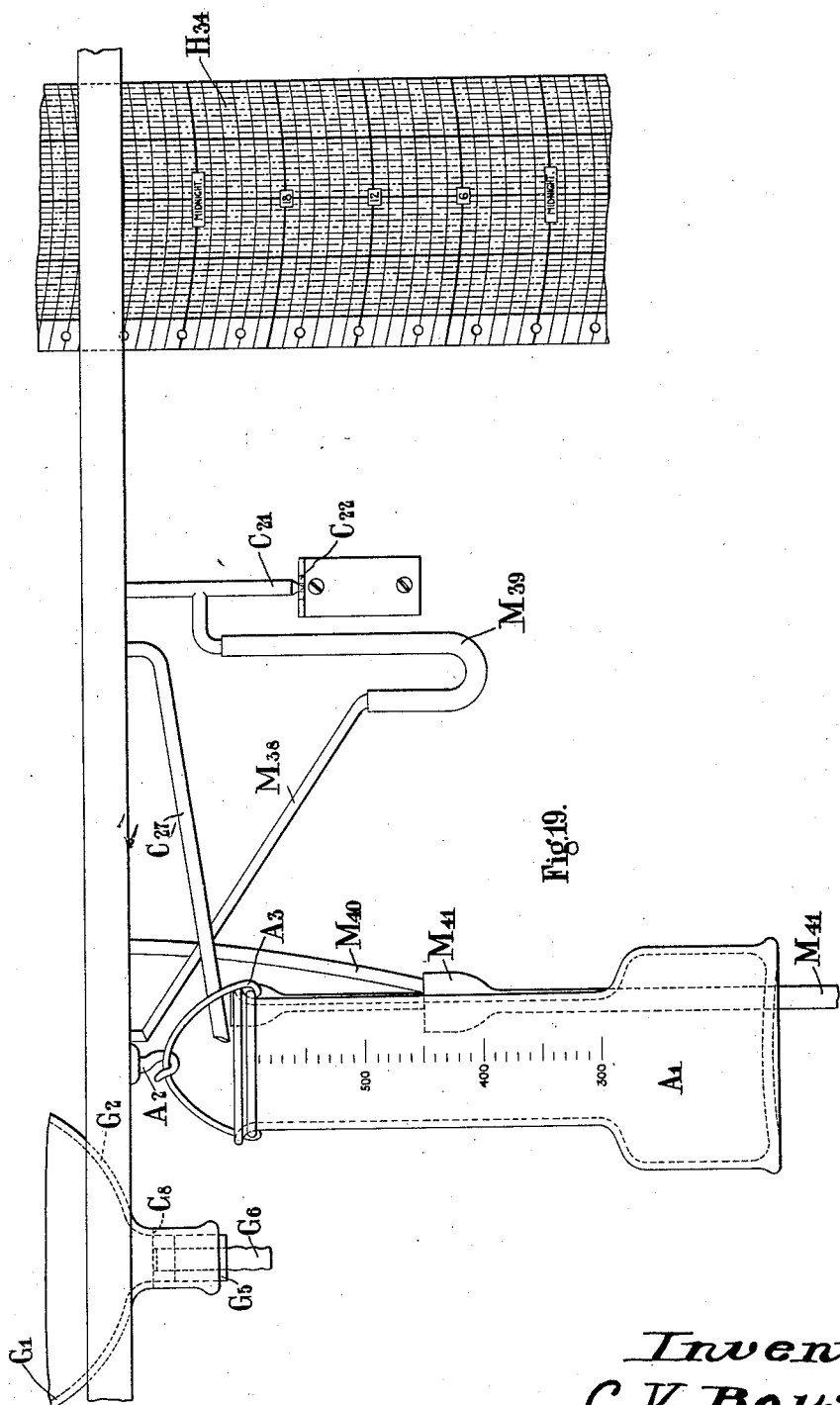

Patented Aug. 27, 1929.

1,726,140

UNITED STATES PATENT OFFICE.

CHARLES VERNON BOYS, OF WESTMINSTER, LONDON, ENGLAND.

RECORDING GAS CALORIMETER.

Application filed January 27, 1921. Serial No. 440,453.

A recording gas calorimeter is intended to solve the following problem. The gas to be tested must be burned continuously and its rate of flow governed and measured. Further the rate at which heat is being produced by the combustion must be ascertained not in terms of heat units per actual volume consumed but in terms of heat units per corrected volume, that is, of the volume that the gas would have occupied if it had been at the standard temperature and pressure and saturated with water at the standard temperature, thus eliminating the disturbances of volume caused by varying atmospheric conditions. The figure obtained by dividing the number of heat units per minute by the corrected volume of gas per minute is the gross calorific value of the gas and this must be automatically and continuously ascertained by the instrument and recorded as by a pen drawing a line on paper moved forwards by clockwork, the result being read on the scale on the paper as British thermal units per cubic foot (corrected) or calories per cubic metre (corrected) or otherwise according to the units adopted. Or to meet special requirements the same scale divisions on the paper may be read as percentage departures from any standard or declared value above or below this standard as the case may be. Further it may be desired to integrate the whole number of heat units produced by the combustion of a definite flow of gas (corrected) from the time at which the instrument was last set or to integrate the departure of the whole number of heat units from that which would have been shown if the gas had maintained its intended value from the time at which the instrument was last set so that, for instance, at the end of three months by merely reading the indication of a pointer on a dial either the whole number or the departure above mentioned may be read without trouble or calculation. This integration may be required in relation to time or in relation to the quantity of gas passing in the main or in relation to both. All this, instruments according to my invention are able to accomplish, every factor being determined positively and none inferentially.

My invention consists in a new combination of the several elements resulting in a new series of interconnected operations whereby accurate results are obtained, parts usually present are eliminated and those remaining and additional parts are of simple construction and the instrument assumes the form of a compact and organic whole instead of comprising a series of detached elements.

My invention further consists in certain special elements suited to take their places in the new combination, which special elements are in some cases available for independent use.

I will first describe in general terms one example of apparatus constructed according to my present invention, afterwards dealing in greater detail with the component parts.

According to my invention the new series of interconnected operations and special new features of the elements are as follows. Water is constantly supplied at a rate greater than that which will be passed through the calorimeter proper this being of the flow type. Water is delivered into a measuring device which when a certain desired quantity has been delivered discharges this quantity into a vessel after which the water stream is diverted into a second vessel. At equal intervals of time, for instance, every thirty seconds, the water again enters the measuring vessel and this process is repeated all the time that the instrument is in operation. By this means the first vessel receives the exact amount required for the action of the calorimeter while the excess to be used for other operations in the instrument passes into the second vessel. An orifice is provided at the bottom of each vessel of such size that the water can escape as fast as it is received when a convenient depth of liquid is attained. The outflow of each vessel then, while subject to a moderate cyclic variation, is continuous and exactly equal in average amount to the water received. As will be seen such short-period cyclic variation can produce no visible or harmful effect on the record.

The water from the first vessel passes next to the calorimeter proper preferably through a long worm lining a containing tower within which the calorimeter is housed. Thereafter it passes through the calorimeter and is then discharged. The calorimeter of the flow type is of simple construction but has two novel features of special importance in a continuously working instrument. Much less gas than usual is advantageously burned in such an instrument so that losses of heat due to imperfect jacketing would be proportionately more serious. By the use of a highly conducting shield, according to my invention, I am able to obtain the same effect that would be produced by a perfectly insulating jacket and thus avoid all heat loss as will be explained below. The acid products of combustion have a corrosive and solvent action on the metal work through which they pass. Accordingly I make this part of the calorimeter of very simple form and easily detachable and replaceable and the calorimeter easily removable from below without disturbing any other part of the combination. The replaceable part is of so simple a form that it may be made of lead with the joints autogenously soldered, thus much reducing the corrosive action and rendering replacement very seldom necessary.

The flow of gas to the calorimeter is both determined and measured by a wet meter of special construction having a differential connection between its drum and a clock governed axle; and the water level in the meter is automatically caused to vary in such a manner that the volume of gas delivered by the meter at each revolution is the same on the supposition that it is measured at standard temperature and pressure and saturated with water vapour. The particular differential connection preferred, is free to turn on a screwed axle so that if axle and drum turn at the same rate there is no end long movement whereas if the rate is different the measuring drum moves one way or the other according to the direction of the relative movement. This longitudinal movement serves to operate a control for the gas inlet, reducing it when the drum is rotating faster than the axle and vice versa. The gas supply is thus maintained at the desired rate if measured under standard conditions and the governor usually required to overcome the inequalities of the matter may be dispensed with because the friction of the meter axle is not only free from that due to a stuffing box, but does not have to be overcome by the pressure of the gas.

The features of the wet meter do not form part of my present invention.

The axle of the meter is conveniently connected directly to the escapement wheel of a pendulum clock driven by a water wheel operated by the waste water from the second vessel aforesaid. By this means the need for both a counting train for the meter and a driving train for the clock is avoided. Furthermore the need for winding is removed and the clock is operated under ideal conditions by a constant torque.

The water level in the meter is caused to vary by raising or lowering an adjustable outlet orifice while a very small quantity is derived as by a wick controlling a duct fed from the water wheel supply or by a cup bucket or siphon having a capillary outlet tube to provide for leakage at the meter axle or elsewhere or for evaporation. The raising or lowering of the outlet orifice is effected conveniently by connecting it to a balance beam or lever, one end of which is moved by the action of a small inverted air vessel dipping in and closed by mercury on which floats a small quantity of water. The volume of the saturated air will vary in the same manner under conditions of temperature and pressure as that of the gas in the meter drum and the connection of the air vessel to the outlet orifice is such that the volume of the gas space in the meter drum is maintained in constant proportion to that of the air in the air vessel as will be explained more particularly hereinafter. By this means a constant supply of gas as measured under standard conditions is provided for combustion in the calorimeter and this may be set for any standard rate such, for instance, as half a cubic foot per hour and the clock itself indicates not only the time but the gas supply as well and as will be explained below, drives the drum carrying the recording paper and the drum of the integrator. So long then as gas and water are supplied and so long as the paper supply for the drum is sufficient the instrument will work indefinitely without requiring attention for winding or setting. It will be apparent en passant that such a meter with variable water level but without endlong movement of the drum on its axis would be useful on a large scale as a works meter showing the actual gas production free from atmospheric disturbances of volume and in other cases where the knowledge of actual gas quantities is desired.

It will be evident that with gas of any particular calorific power the rise of temperature of the water in its passage through the calorimeter will depend on the relative volumes of gas (corrected) and water allowed to pass and each of these are independently governed by the clock but may be made such as will give a convenient temperature rise. Conversely where the calorimeter is to be used for ascertaining if gas is of some particular declared value, and if not by how much it departs therefrom, the water measuring vessel may be given such capacity that if the calorific power of the gas has the declared value then a particular rise of temperature, for instance, 10° or 20° C. or 18° or 36° F., will take place in the calorimeter. For such purpose it is convenient that the measuring capacity should be adaptable to the declared value. With such an arrangement the same recording paper and recording means and the same rise of temperature are suitable without alteration for any declared value and the departures therefrom will be proportions of the whole conveniently shown on the recording sheet as percentage departures therefrom (+ or − as the case may be). Where, however, it is intended that a record of calorific value of gas, irrespective of any declared value but in direct terms, should be recorded then it is more convenient to choose a size for the water measuring vessel which will give rise to an elevation of temperature such that the number of degrees rise is an aliquot part of the figure expressing the calorific value. For example, if with gas of a calorific value of 540 British thermal units per cubic foot (corrected) a rise of temperature of 27° F. is produced, then the ratio would be 20 and, whatever the calorific value may be, the recorded value on the paper's scale would always be 20 multiplied by the rise of temperature as shown by two thermometers an arrangement which greatly facilitates the testing of the whole apparatus. These two examples are given to show how the invention is available for two usual types of use and the same record paper is adaptable for either as required.

In order to cause a pen to move over the paper I make use of relatively large operative thermometers filled with a liquid having a high "a" co-efficient of expansion but a relatively low "b" co-efficient when the volume is expressed by an equation of the usual type $V_t = V_o (1 + at + bt^2)$. I have found amyl alcohol a suitable liquid and it has shown no sign of corrosive action on the metal by which it is contained. One bulb is in the inlet water compartment of the calorimeter casing and the other bulb is in the outlet compartment, each bulb being connected with a variable capacity indicator such as a group of aneroid diaphragms the movements of which, owing to expansion or contraction of the liquid, are a measure of the changes of temperature. Owing to the use of bulbs of large size, a sufficient expansion is obtained and owing to the expansion being that of a liquid and not of a gas the movement is one of insistence and not a mere elastic or persuasive push, which is all that can be obtained from a gaseous content. The two thermometers are so mutually proportioned as to give slightly different linear movements for the same change of temperature. For instance, I prefer to make the bulb of the inlet or cold water thermometer of greater capacity than that of the hot water thermometer in the ratio of 10:9 and the aneroid devices have equal diameters so that the linear movements are in the ratio 10:9 for the same change of temperature in each. The first magnifying lever is also made to magnify the movement of the hot water 10 times and of the cold water thermometer in the opposite direction 9 times. Other proportions might of course be chosen provided the lever magnification and thermometer relative movements correspond. By this means I am able to compensate for variations of temperature of the inlet water for as this affects the temperature of the two thermometers equally the far end of the first lever is not moved thereby but only by difference of temperature. The far end is connected by a link with the short arm of the pen lever. The pen is at the end of the long arm and this writes directly on the travelling paper. The length of the short arm is adjustable so as to make the scale of magnification correct. The length of one of the connections between the aneroid boxes and the thermometer lever is adjustable so that the pen may be set to the correct division on the paper to correspond as already explained with the observed difference of temperature of two standard thermometers in the inlet and outlet water of the calorimeter respectively. In order that the scale of magnification may be ample enough with a conveniently narrow band of paper I prefer to arrange that only a moderate part of the scale of calorific value, or only a moderate departure from the declared value, for instance in the latter case, from $-20°$ to $+20°$ is provided on the paper or so much of a complete scale as is ever likely to be required. I arrange that when the calorimeter is not in use, or when the two thermometers differ in temperature by an amount which would move the pen off the paper at the low value end, the connection between the aneroid box and the thermometer lever merely goes out of engagement and the pen lever is not driven past a limiting stop; and I cause a slight torque to be applied to the axis of the pen lever tending to move the pen towards the low value end of the record.

In the rocking axis of the pen lever I provide an integrator of the Amster type so as to integrate with respect to time the departure of the pen from its middle position. The construction of this will be described below in detail but it may be mentioned here that a cross axle is driven by a worm on the clock axle and this cross axle drives an operative drum at the rate of one turn per day. The integrating wheel is equal in diameter to the drum and the pen lever is made 100 times as long as a 1% departure from the declared value on the paper scale. With such proportions at the end of any period since it was last set a reading taken on the integrating wheel is interpreted as follows: This being divided into 100 parts each division on the $+$ or $-$ side corresponds to an integrated value equal to that which would be produced by one day's excess or defect of 1% as the case may be. Of course other proportions may be used but integrators are well understood and need no more explanation. If the record is one of actual calorific value and the pen lever is 100 times as long as the movement corresponding to one unit then the integrated result is interpreted as follows: If the record is zero then the average value of the gas is that of the division marked by the pen when in its middle position. If the reading is, for instance, +5 that means that the excess over the value, indicated by the middle position of the pen, is that which would be produced if the gas had the middle position value all the time except for five days when the excess was 1 unit, or for one day when the excess was 5 units, and similarly for other proportions as will be understood by those conversant with integrators. The integrating wheel is carried in a lantern in the pen axis and the weight of the whole is carried on the operative drum. Where the friction or wear due to such a pressure is more than is desirable I counterbalance in part the weight of the pen lever axis and lantern and the same thread which is used for giving a torque to the axis may be used to counterbalance it in part by giving it an inclined and eccentric pull.

If, in addition to the integral in respect of time, it is desired to find the integral in respect of quantity, or in other words, the total quantity of heat which would be produced by the combustion of the gas passing in any main, then I measure this gas by an inferential meter (if that be accurate enough) or by an actual meter of the type described herein, large enough to carry the whole of the gas, which meters actual gas irrespective of its adventitious changes of volume. The measuring drum of the meter is connected, by gearing with a known ratio, to the drum of a second integrator similar to and so connected as to move the first. The record on the integrating disc of the second integrator enables the heat value of the gas that has passed since the instrument was last set to be ascertained as explained best by an example; if, for instance, one turn of the integrating drum were caused by the passage of 1,000,000 cubic feet (corrected) of gas and the pen lever were 100 times as long as the distance on the record corresponding to 1%, then if 500 were the declared value, then the record would be "zero" if the gas had maintained on the average its declared value, and "500 multiplied by the number of cubic feet (corrected) shown by the meter" would be the heat value of all the gas that had passed; but if the reading were, for instance "+20" then the heat value of the gas would be "that already found $$+\left\{\frac{20}{100}\times\frac{\text{number of cubic feet}}{1,000,000}\times 500\right\}".$$

It will be evident that the integrated result in respect of quantity will be correct provided both the calorimeter meter and the main meter correct the gas for volume or provided neither do.

I make the same cross shaft which drives the integrator drum drive also the drum carrying the record paper. This cross shaft ending the front of the instrument is made to turn in the counterclockwise direction once in half an hour and all three worms are right hand screws. I employ the front end of this shaft to turn wheels one at one turn an hour and the other at one turn in twelve hours in the clock direction and hands moved by these show the time on a clock face on the front of the calorimeter tower.

All the parts of the combination are carried on shelves or brackets round the calorimeter tower and thus form a compact and organic whole rather than a series of separate and semi-independent instruments.

If when left unattended the water supply should be cut off, the calorimeter has the advantage that the clock will immediately lose its motive power and stop and the meter drum will run on the screw and shut off the gas thus preventing automatically overheating of the calorimeter, with possible destruction of some of its parts. If the water supply is resumed the bucket will tip over and be caught by the detent but the clock will not start and no more gas will flow. The time of the stoppage will remain recorded on the chart.

If, during the unattended operation of the instrument, the gas should be cut off the flame would go out and the meter drum, not now being driven, would be screwed in such a direction as to open the gas way until it reached the limit of its movement when the clock would be stopped. If thereafter the gas should be turned on again, the meter would turn so far as to screw the drum to the other extreme and cut off the gas, now not burning, automatically. If the clock were a pendulum clock it would not start again but if a balance wheel clock it might do so and in that case the gas, having gone out, would again pass at the proper rate and, not being burned, would escape. This is a reason for preferring a pendulum clock.

If for any reason the clock should stop the gas meter drum would move on its screw closing the gas constriction and putting out the flame while the calorimeter would be deprived of water.

From these considerations it will be seen that the combination of elements is such that, in the event of such accidents as might occur, neither is the calorimeter a source of danger to the building in which it is placed nor is there any necessity to provide special safety devices operated by extremes of temperature or otherwise which, besides being additional complications are liable to fail from want of use.

Referring now to the accompanying drawings:—

Figure 1 is a plan partly in section of the whole apparatus extending to the left only as far as the gas meter, and omitting the regulating top and testing vessels. In Figure 1 the lids of the calorimeter tower and hot water channel are removed to show more clearly what is below them even though the expansion boxes and thermometer bulbs carried by one of them are shown in position. Parts of the plan are shown in section.

Figure 2 is a front elevation partly in section of the upper part of so much of the instrument as is shown in Figure 1.

Figure 2$^a$ is a sectional view on the line $x$—$y$ of Figure 2.

Figure 5 is a vertical section through the calorimeter tower on the line 5—5, of Figure 6, of the tower and so much of the instrument as is within the tower.

Figure 6 is a plan of Figure 5 with part cut away and with the thermometer bulbs and connections absent.

Figure 7 is a view from below of the water and gas channel constructions only.

Figure 7$^a$ is a section on the line 6—6 of Figure 7.

Figure 8 is an elevation from the left of Figure 7.

Figure 9 is a portion of a detail of Figure 5.

Figures 10, A to L, are a number of views of the meter drum and a geometrical diagram explaining its principle of action.

Figure 11 is a front view of the regulating tap and control valve with front plate removed.

Figure 12 is a horizontal section through the axis of Figure 11.

Figure 13 is a back view of Figures 11 and 12.

Figure 14 is an elevation from the left of Figure 11.

Figure 15 is a back view of the front plate of the tap.

Figure 16 is a front view of the front plate of the tap.

Figure 1:
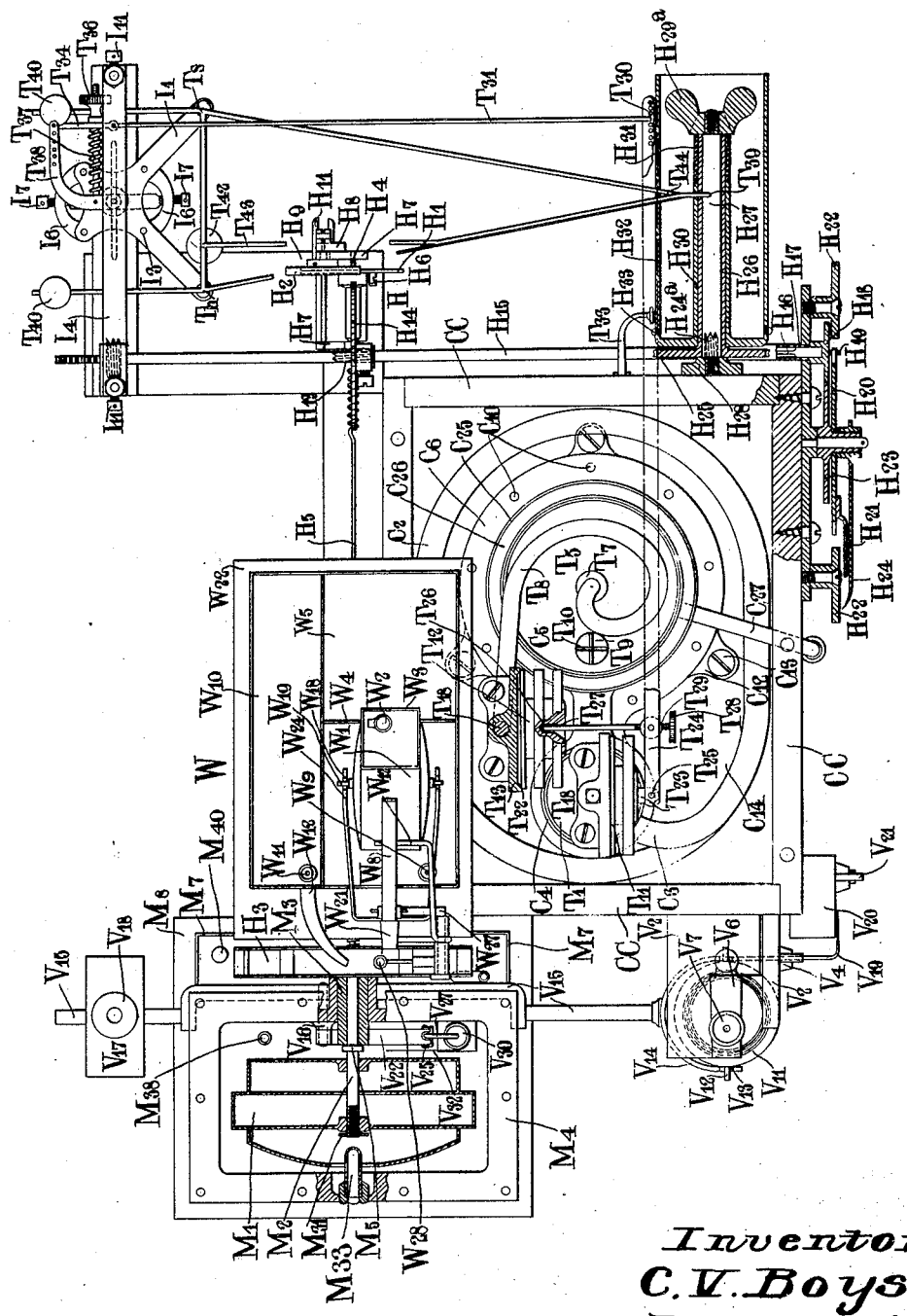
Figure 17:
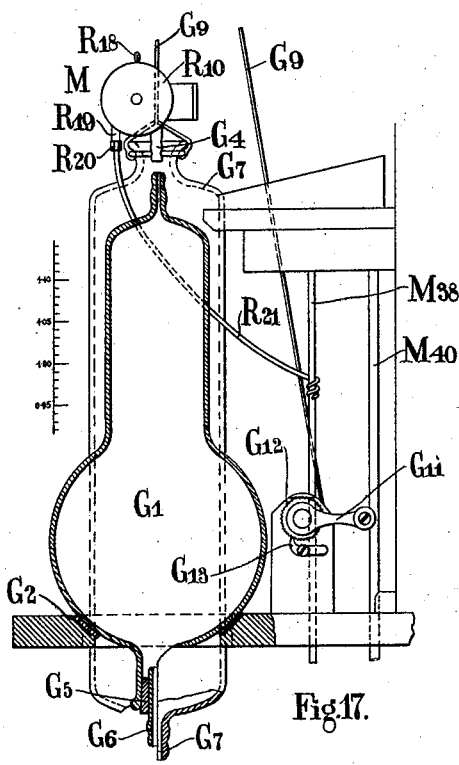

Figure 17 is a front elevation partly in section of the testing appliances (situated to the left of the parts shown in Figure 1).

Figure 18:
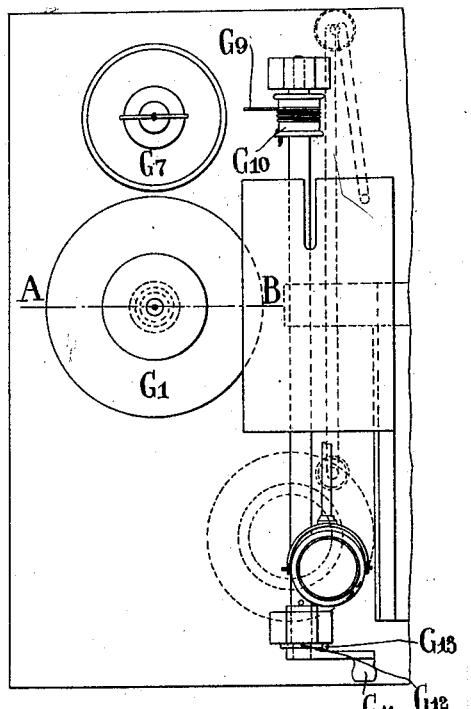

Figure 18 is a plan of Figure 17.

Figure 19 is a front view of the parts below the shelf or table upon which all the parts shown in Figure 1 are carried.

Figure 20:
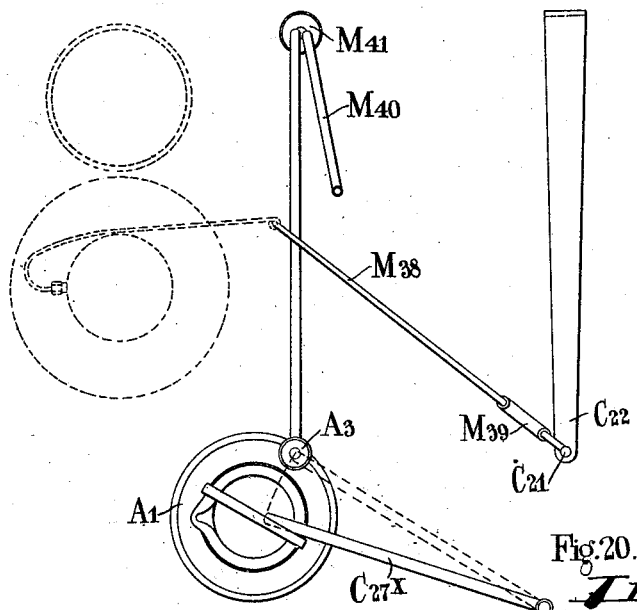

Figure 20 is a plan of the parts shown in Figure 19 with the position of relative parts above the shelf indicated by dotted lines.

Figure 2:
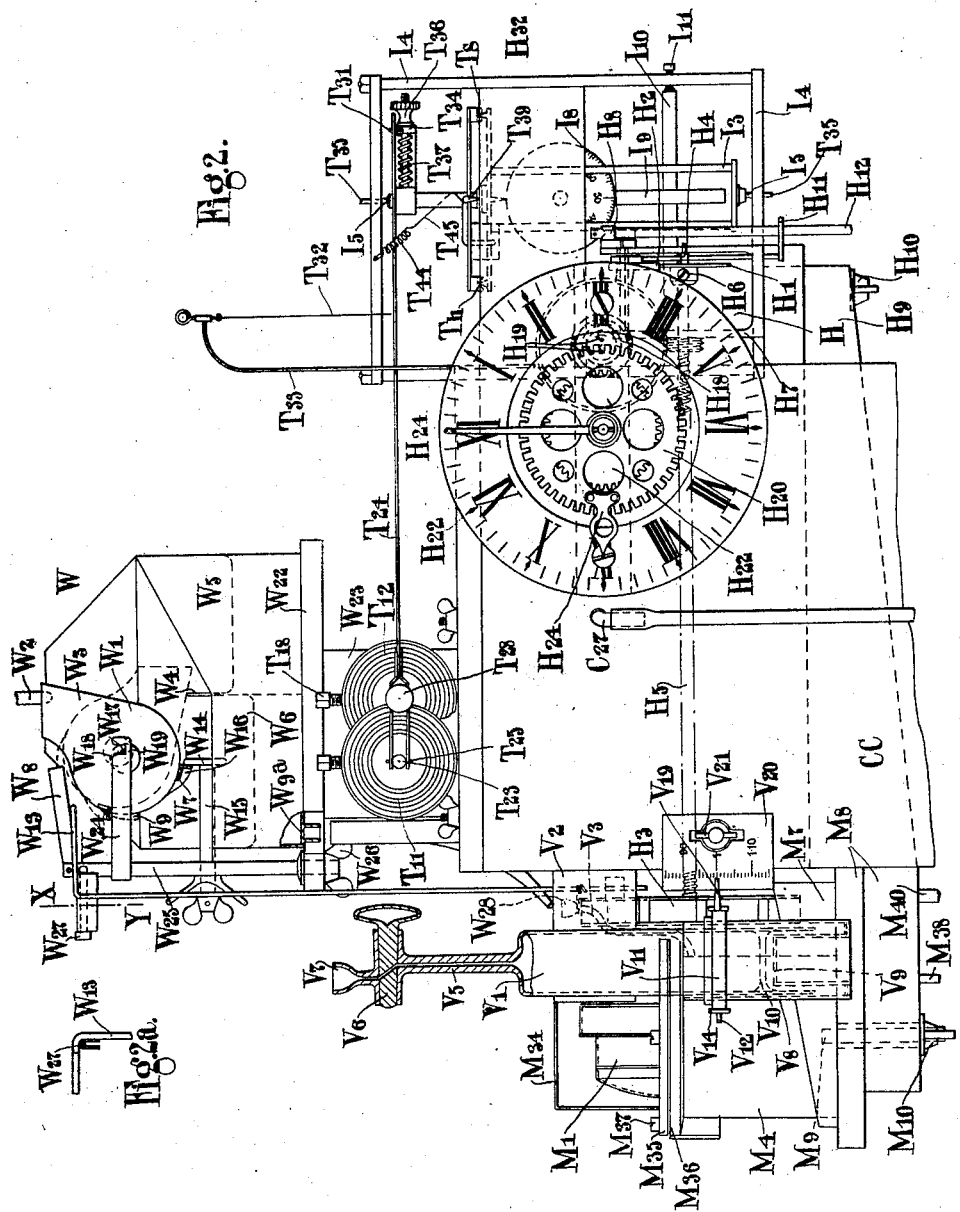

Dealing now in detail with reference to the accompanying drawings with the parts in the order mentioned in the earlier part of this specification, the water measuring device W (Figures 1 to 4) is shown as consisting of an eccentrically supported vessel $W_1$ into which water is directed by the jet $W_2$ until it is filled to some point in the eccentric neck $W_3$ at which the balance of the vessel is destroyed and it tips over to the position shown in dotted lines in Figure 2, being arrested by the partition $W_4$ between two water compartments $W_5$ and $W_6$ and discharging its contents into $W_5$. The water vessel $W_1$ then tending to revert to its former position under the influence of the small weight $W_7$ is prevented from so doing by the engagement of the pawl $W_8$ with the detent $W_9$ thus allowing all the water to drain from $W_1$. The water passes from the compartments $W_5$ to $W_6$ through a hole of such size as to maintain a moderate average difference of level of the water in the two compartments and the water leaves the compartment $W_6$ by the orifice $W_{9a}$ which directs it into the end $C_1$ of the pipe $C_2$ (Figure 5) which is coiled round within the calorimeter tower. This orifice should be of such size as to maintain an average level of water approximately as shown by dotted lines in Figure 2. When the vessel $W_1$ is in its tipped-over position the water from the jet automatically falls into the back water compartment $W_{10}$ as indicated by the dotted trajectory (Figure 4) from which it issues by the orifice $W_{11}$ and so is delivered by the tube $W_{12}$ (Figure 3) to the water wheel $H_3$ of the meter. After an interval determined by the rotation of the water wheel, itself governed by and driving the clock, a projecting lug on the water wheel (shown dotted in Figure 1) wipes past the tail of the lever $W_{13}$ rocking the same about its fulcrum pin $W_{27}$ and causing the pawl $W_8$ to be lifted by the lever $W_{13}$ thus allowing the water vessel to resume its former position. The movement is arrested by the head $W_{14}$ of the screw stop $W_{15}$ acting on the detent $W_{16}$. This is arranged below the vessel as shown so that under the influence of the shock the supporting pin $W_{17}$ is every time jerked back towards or against the back vertical edges $W_{18}$ of the recesses in which it moves having thus a clear and unobstructed path to roll forwards on the bottom $W_{19}$ of said recesses thus being free from all except rolling friction so that the measurement of the water may be as exact as possible. The screw stop may be adjusted by turning the wing head $W_{20}$ to bring the water measured to the exact quantity required and the position secured by means of the lock nut $W_{21}$. As will be evident from Figures 1 to 4, the triple water vessel $W_5$ $W_6$ $W_{10}$ rests upon a shelf $W_{22}$ carried by the upright $W_{23}$, itself secured to the calorimeter tower CC and the recesses $W_{18}$ $W_{19}$ are cut in the arms $W_{24}$ of the upright $W_{25}$ itself bolted to the shelf $W_{22}$ by means of the wing nut $W_{26}$ and to this upright $W_{25}$ the screw $W_{15}$ is secured by the lock nut $W_{21}$. The lever $W_{13}$ can be lifted off at any time as also can be either of the water vessels.

The construction of the calorimeter proper may be best understood from a consideration of Figure 1 and of Figures 5 to 9 in conjunction with the following description.

The water from the vessel $W_6$ passes direct into the end $C_1$ of the coil of pipe $C_2$ which is led round within the calorimeter tower CC and ultimately discharges at the turned over other end $C_3$ into the cold water compartment $C_4$ of the calorimeter proper. The cold water compartment $C_4$ and the hot water compartment $C_5$ of the calorimeter are each secured by a sound water-tight connection such as solder to the base $C_6$ in which a communicating passage $C_7$ is drilled and a water groove or ring $C_8$ is turned or cast. The open lower end of the hot water compartment $C_5$ and base $C_6$ are closed by a plate $C_9$ being secured thereto by the screws $C_{10}$ and the joint rendered water-tight by the washer $C_{11}$. The plate is provided with three ears $C_{12}$ by which screws $C_{13}$ fix it to the wooden base $C_{14}$. The base $C_6$ is pierced to admit of the updraught central gas channel $C_{15}$ and the down-draught gas channels $C_{16}$ of which nine are shown, but this number is not essential, and the upper ends of the gas channels are joined by means of the hot gas box $C_{17}$ made as shown in two pieces secured together and to the gas channels so as to be absolutely water-tight by solder or by autogenous soldering. If desired I may provide an annular tray beneath the lower ends of the gas channels $C_{16}$ to catch drops of water which may form owing to condensation within the up draught or down draught gas channels.

This tray (not shown) may communicate conveniently by a pipe with the general sump.

The wooden base $C_{14}$ is supported on buttons $C_{18}$ under the shelf or table on which the calorimeter tower CC is supported, so that if these buttons are turned the wooden base and calorimeter structure can be withdrawn from below without disturbing any of the apparatus above or around the tower. The wooden base $C_{14}$ is pierced with a hole $C_{19}$ through which the down draught gas channels protrude and this orifice is closed by the plate $C_{20}$ so that the only entry for air of combustion is round the edge of the base. There is a central hole in said plate to allow of the stem of the gas burner $C_{21}$ entering, which burner tube rests at its lower end in a hole on the end of a spring support $C_{22}$ (Figures 19 and 20) pressing up the burner until a flange $C_{23}$ on the stem bears against the plate $C_{20}$ and thus locates the burner and allows it to be removed easily at any time for inspection, and also allows any heat that may have passed down the burner tube to be conducted back to the calorimeter. The water coil $C_2$ is conveniently supported on racks $C_{24}$ (Figure 9) situated within the corners of the tower CC.

To prevent loss of heat from the hot water compartment $C_5$ which even with the best insulation would be sufficient to be undesirable, I place a highly conducting exterior tube $C_{25}$, see Figure 5, round the upper part of the hot water compartment $C_5$ securing it thereto by the ring $C_{26}$ the three being soldered together. The exterior of the tube $C_{25}$ and of the lower part of the hot water compartment $C_5$ are insulated by a thick coating of flannel, felt or other non-conductor of heat and this may be used also in the annular space between $C^5$ and $C^{25}$ (as shown). By this arrangement all the heat which escapes through imperfect insulation from the tube $C_{25}$ is provided by the heat of the water which has done its work upon the bulb of the hot operative thermometer to be described and just before it is discharged by the pipe $C_{27}$ (Figure 1) which pipe must of course be unscrewed before the calorimeter proper can be removed from below as already described. As in the working of the calorimeter the water rising in the hot water compartment does not rise in temperature appreciably until it is within an inch or two of the hot gas box $C_{17}$ after which the rise is very rapid, it is clear that if the length of the tube $C_{25}$ is properly chosen so as to terminate round the region of rapid rise and at the right part thereof, the passage of heat due to excess of temperature of $C_{25}$ over that of $C_5$ over a small area may be made very nearly equal to that due to the very slight defect of temperature over the much larger area above, and thus in the aggregate there is neither gain nor loss of heat from the sides of the hot water compartment $C_5$, a most important result in view of the necessarily large area of the hot part of this tube and of the very serious effect of any loss where the amount of gas being burned is very much restricted. The upper end of the hot water compartment is closed by a plate $C_{26\times}$ with an aperture $C_{27\times}$ through which a standard thermometer may pass and the cover or the top of the compartment $C_5$ has an aperture through which the tube $T_8$ from the hot water thermometer bulb $T_5$, to be described later, may pass. Any loss of heat from the plate $C_{26\times}$ is derived from the water after it has done its work upon the hot thermometer bulb $T_5$ and thus the provision against all loss of heat is complete.

It will be evident that the water in its ascent in the hot water channel passes up through the narrow fluted spaces round the hot gas box after which, to equalize the temperature of all parts of the stream, it is constrained by a conical shield $T_{28}$ with a central orifice $T_{29}$ to pass through this orifice and thereafter is spread out and passes up through the annular space round the hot thermometer bulb $T_5$ and in part through the hot thermometer pocket $T_9$. The conical shield $T_{28}$ is located by feet $T_{30}$ resting on the hot gas box $C_{17}$.

Figure 3:
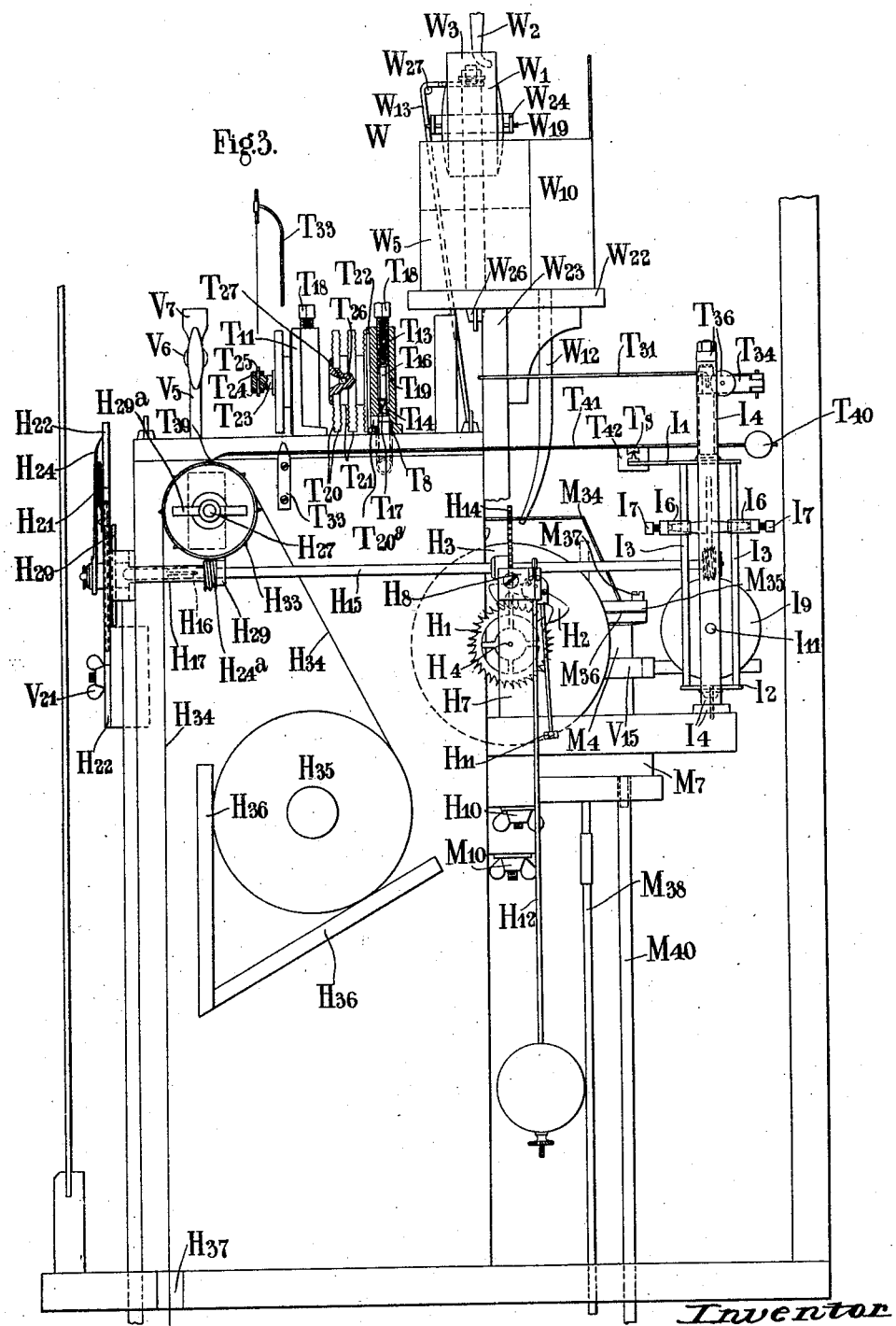
Figure 3 is a side elevation from the right of so much of the instrument as is shown in Figure 1 with one expansion box in section.

The bulbs of the operative thermometers are made of unequal capacity as already explained, and in the arrangement illustrated the cold water bulb has a capacity greater than that of the hot water bulb in the ratio of 10 to 9—this being the ratio in which the first thermometer lever is divided. The cold water thermometer bulb consists of a tube $T_1$ nearly filling the lower part of the cold water channel $C_4$ of the calorimeter. The tube $T_1$ is closed at its lower end by a plate $T_2$ and at its upper end by a neck $T_3$ into which the tube $T_4$ is screwed and soldered so as to ensure absolute freedom from leakage. Similarly the hot water thermometer bulb $T_5$ is made of a shorter and wider tube nearly filling the lower part of the hot water channel $C_5$ immediately above the hot gas box $C_{17}$ closed also by a plate $T_6$ below and a neck $T_7$ above into which the tube $T_8$ is screwed and soldered. The hot water bulb is also pierced in the vertical direction by a tube $T_9$ bridged by wires $T_{10}$ so as to serve as a pocket for the bulb of a standard mercurial thermometer. The cold water thermometer bulb is not so provided as the corresponding standard thermometer may be placed in the water above the bulb and merely rest on the top of the bulb. The tubes $T_4$ and $T_8$ communicate respectively with the cold and hot expansion boxes $T_{11}$ and $T_{12}$, the cold one $T_4$ directly, but the hot tube $T_8$ in a curved path as shown so that it may have an extended path in the hot water above the hot water thermometer bulb so that heat conducted by it outside the calorimeter tower will be derived from the hot water after it has acted on the hot water thermometer bulb and in no degree from said bulb. The expansion boxes $T_{11}$ and $T_{12}$ are alike in diameter and general formation except that the hot water box $T_{12}$ is provided with five elastic diaphragms while the cold water box is shown with only three so that the hot water box may accommodate the greater expansion due to the greater range of temperature of the hot water bulb. Each expansion box has as a foundation a casting $T_{13}$ in which a hole is drilled from the top to the bottom with a constriction $T_{14}$, as shown in Figure 3, to serve as a valve seat. Into the lower end the tube $T_4$ or $T_8$ is secured by screwing and soldering while into the tapped upper end the screw valve with reduced stem $T_{16}$ and conical end $T_{17}$ may be forcibly screwed by a key acting on the squared head $T_{18}$ so as to seal with certainty the outlet at the valve face $T_{17}$. There is a small hole $T_{19}$ leading to the outside above the valve face and a larger hole $T_{20a}$ leading to the elastic partition space from the space below the valve. Thin discs of metal $T_{20}$ are stamped or spun into the form shown and three or five (or other number desired) are connected together by rings $T_{21}$ cut from tube and soldered and the lip of the first is secured by solder to the circular groove $T_{22}$ in the casting. The gap in the last is closed by a plate soldered in. The cold box plate carries a short projection $T_{23}$ to which the first thermometer lever $T_{24}$ is pivoted by the pin $T_{25}$ while the hot box $T_{12}$ is closed by a plate which carries a projection $T_{26}$ entering the box and drilled with a hole $T_{27}$ so as to provide an abutment for the screw $T_{28}$ (Figure 1) which passes through the swivelling nut $T_{29}$ in the thermometer lever $T_{24}$. By means of the screw $T_{28}$ the exact position of the pen on the recording sheet may be adjusted so as to agree with the result deduced from the readings of the standard thermometers as will be made more clear later. The far end of the first thermometer lever $T_{24}$ is provided with a number of holes $T_{30}$ close together so that when the compensation of this lever is tested by supplying the calorimeter with water first as cold and then as warm as any that may be expected, so that both bulbs are at the same temperature on each occasion, the particular hole may be chosen as the pivot for the connecting link $T_{31}$ to the second thermometer lever which corresponds to no movement of the latter for the change of temperature of the pair of thermometer bulbs. Alternatively a sliding block with a hole in it may be used if preferred. On no account is this adjustment to be used for adjusting the scale of magnification for which special provision is made. The weight of the unsupported ends of the first thermometer lever $T_{24}$ and link $T_{31}$ is taken by a thread $T_{32}$ (Figure 2) supported by a gallows $T_{33}$ fastened to the calorimeter tower CC.

Figure 4:
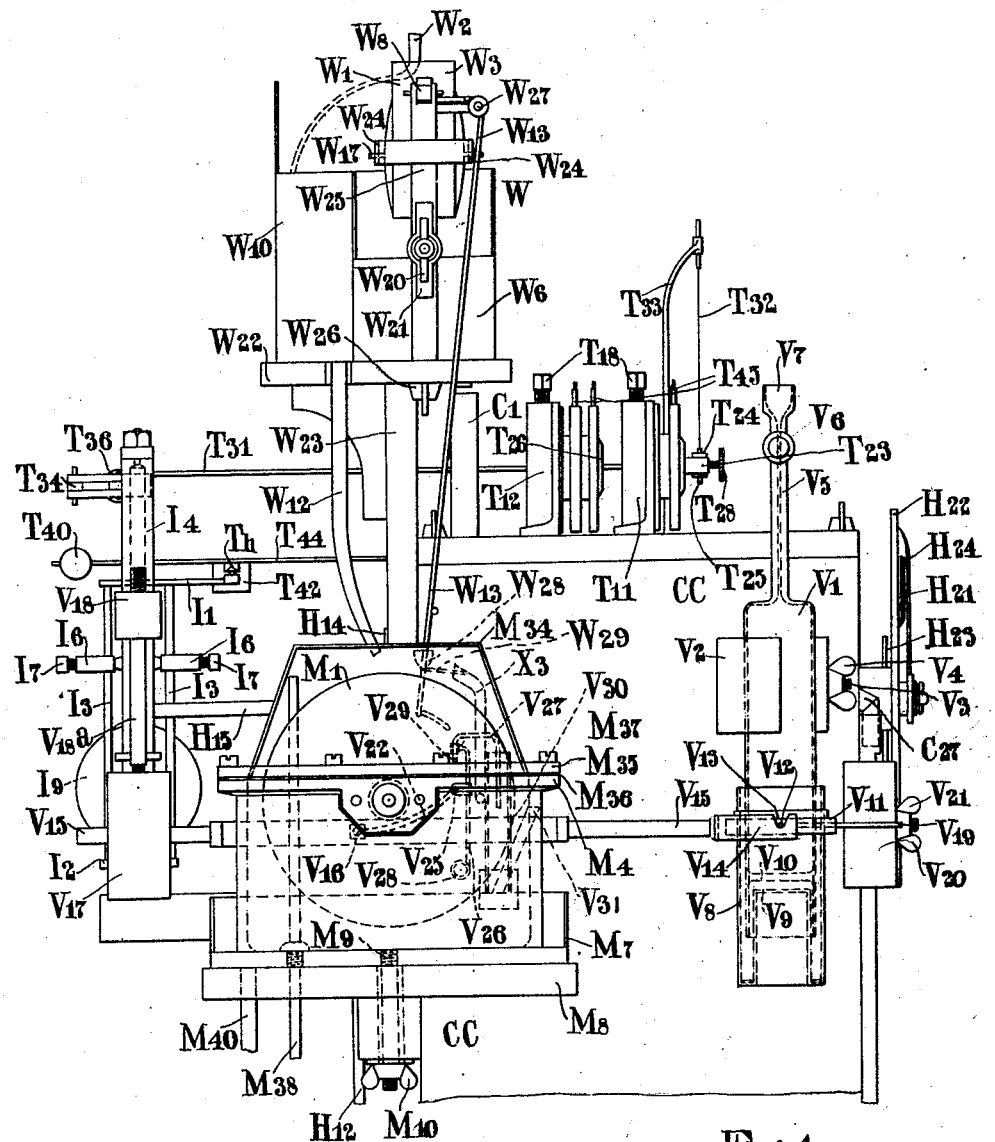
Figure 4 is a side elevation from the left of the upper part as in Figure 2.

Each end of the link $T_{31}$ is turned down at right angles at the front end to enter one of the holes $T_{30}$ and at the back end to enter a hole in the hinged link $T_{34}$ (Figure 1) the distance of which from the pen and integrator axis $T_{35}$ is capable of adjustment through a considerable range partly by the action of the milled nut $T_{36}$ and opposing spring $T_{37}$, giving a fine adjustment, and partly by changing the position of the pin of the hinges from one to another of the holes in the cranked arm $T_{38}$ secured to the pen or integrator axis $T_{35}$ and choice of a longer or shorter spring as required. The long arm of the pen lever at right angles to the short arm is as long as the distance from the axis $T_{35}$ to the writing point of the pen $T_{39}$. The pen, however, is capable of vertical motion about a horizontal axis about which it is in part balanced by the counterweight $T_{40}$ so that the pen may rest upon the paper very lightly but certainly and from which it may at any time be lifted for examination or replacement. The pen rests upon two upturned points on the arms $I_1$ of the integrator lantern which is all in one with the vertical pen axle there being in the pen frame $T_{41}$ a conical hole $T_h$ and a slot $T_s$ pointing thereto which, as is well known, constitute a geometrical hinge allowing of only one movement. The pen frame carries a small ink-well $T_{42}$ and the pen preferably made of a fine silver tube $T_{43}$ dips at one end into the ink-well while the other end protrudes through the end $T_{44}$ of the pen frame which carries it. By means of the large possible adjustment of the short arm of the thermometer lever a wide range of magnification is available according to the purpose for which the record is to be used or the scale of magnification desired. It will be evident from the construction so far described that if it is desired to obtain a calorimetric record of gas which is liable to a moderate variation only, there is no necessity to include the whole range on the recording sheet from O to the highest possible value. If, for instance, the gas to be examined normally produces 550 British thermal units per cubic foot (corrected) of the gas and it can never rise above 650 or fall below 450, there is no necessity to provide a greater range than from 450 to 650 or perhaps from 500 to 600 on the recording sheet so that the scale of magnification may be proportionately increased. This the adjustment of the short arm of the thermometer lever allows and the ruling of the sheet or value to be ascribed to the rulings is adapted accordingly. When with such arrangement the gas is cut off and the rise of temperature in the calorimeter is at an end the contraction of the hot expansion box does not drag the pen past the end of the drum or force it against any stop that may limit its motion for the recess $T_{27}$ merely leaves the abutting end of the screw $T_{28}$ with which it is ready to engage when the hot thermometer rises in temperature again. A spring $T_{44'}$ and thread $T_{45}$ attached respectively to the integrator frame and pen or integrator axle $T_{35}$ tend to direct the pen towards the low value end of the record and are overcome by the expansion of the fluid in the hot thermometer bulb $T_5$ expanding into the elastic expansion box $T_{12}$. The thermometer bulbs are filled with amyl alcohol or other liquid having the desired characteristics already described, by removing the screw valve, by the use of a capillary funnel or by warming and cooling, as is well understood by thermometer makers, and the air is removed from the elastic boxes by inclining them and pressing in and out while the liquid is supplied as required. Or alternatively, as shown in Figure 4, fine tubes $T_{45'}$ may be soldered to the highest points in the expansion boxes so that the air may escape through these tubes. Then after pinching these tubes to close them they may be sealed hermetically with solder. When filled each with liquid at about the mean temperature of the whole range to which it is liable to be exposed, the screw is put in and forcibly screwed down on to its seat whereby all leakage is made impossible and in the process the liquid above the valve seat is able to escape at the hole $T_{19}$ from which the remaining liquid may in time evaporate.

The vertical pen or integrator axle consists for the most part of the lantern $I_1 I_2 I_3$ (Figure 3) made of an upper plate $I_1$, lower plate $I_2$ and rods $I_3$, and pivoted above and below in the integrator frame $I_4$ by means of wires $I_5$ (Figure 2) which allow certain vertical freedom as well as freedom to turn. The rods $I_3$ of the lantern carry two bent bars $I_6$ with screwed pivots $I_7$ on which can turn freely and without shaking the divided integrating wheel $I_8$. An integrator drum $I_9$ is carried on an axle $I_{10}$ which cuts through the lantern and is supported on pivot screws $I_{11}$ in the integrator frame $I_4$ on which it can turn freely and without shaking. The weight of the integrator frame is carried in part by the integrator wheel $I_8$ which rests upon the integrator drum $I_9$ and in part by the tension of the spring $T_{44}$ and thread (Figure 2) which serve also to move the pen towards the low value end of the record sheet and free the whole pen and thermometer lever system from backlash. By varying the angle of pull and tension of spring both of the consequent actions can be varied at will. The axle $I_{10}$ is turned at a known rate—as shown in the drawings, once a day—by means of a worm-wheel on the axle $I_{10}$ and worm on a cross axle as will be described when the meter-clock and record drum combination is explained. The integrator then will give on the divided integrator wheel a record of the integrated value of the departure of the pen from its mean position with respect to time measured from that at which it was last set to Zero + or − as the case may be. If it is expected that the integrator wheel will make more than one turn a worm or other counter can be added as in an Amsler planimeter, but for the purpose of checking the value of gas which is intended to comply with a certain standard, this is unnecessary, more especially as the wide departure from the standard value which a whole turn would indicate would be found upon the record sheet from which it could independently be determined.

The clock H is a clock of one escapement wheel $H_1$ and recoil pallet anchor $H_2$ only, there being no driving train needed. The driving couple is produced by the action of the waste water from the water vessel $W_{10}$ filling the buckets of the water wheel $H_3$ carried on the meter axle to be described later but driving the escapement wheel arbor $H_4$ through the elastic connection $H_5$. The escapement wheel is conveniently loose on the arbor $H_4$ being connected thereto by the pinching screw $H_6$. It follows from this construction that as this arbor can be withdrawn without separating the plates $H_7$ forming the frame of the clock and the anchor arbor can be removed by unscrewing the usual pendulum cock $H_8$, there is no necessity to make the clock frame with separable plates but a single casting or piece of flat brass bent up twice at right angles is all that is needed. The clock is held down on to the bracket $H_9$ which carries also the integrator frame by means of a bolt and wing nut $H_{10}$. The crutch $H_{11}$ and pendulum $H_{12}$ being of ordinary clock construction do not need further description. As shown in the drawing the escapement wheel is intended to turn once in 30 seconds but any other rate of rotation that is preferred may be adopted with corresponding consequent changes. The arbor $H_4$ carries outside the clock frame a worm $H_{13}$ which engages a worm wheel $H_{14}$ of sixty teeth so that the shaft $H_{15}$ which carries this worm wheel turns once in half an hour and as arranged this is in the counterclockwise direction as seen from the front. The shaft $H_{15}$ carries at its back end a worm which engages with a wheel of 48 teeth on the integrator drum axle so that this axle turns once a day in such a direction that the edge of said drum as seen from the front moves upwards, while at its front end it is split by a saw cut $H_{16}$ and the two halves sprung slightly apart so that when pushed in to the short tubular axle $H_{17}$ it drives it, but allows it also to be turned independently. This short tubular axle $H_{17}$ carries at its front end a wheel $H_{18}$ of 30 teeth or of any number that is convenient and also the two pins $H_{19}$ which with the wheel $H_{20}$ of 48 teeth of peculiar form, as shown in the drawings, form a known kind of gear so that the wheel $H_{20}$ turns once in 12 hours in the clock-hand direction and carrying a hand $H_{21}$ shows the hour on a dial $H_{22}$. A wheel $H_{23}$ of twice as many teeth as the wheel $H_{18}$ shows the minutes on the dial $H_{22}$. The details of this part of the instrument do not need description as they represent ordinary clock construction but the peculiar gearing is advantageous for the two reductions of 2 and 24 to 1 respectively and the reversal of direction in each case. The correct indication of time by the clock is a satisfactory indication that the whole machine is working normally and that, as will be seen later, the gas is passing at the intended rate, this being in the case shown in the drawing at the rate of half a cubic foot (corrected) per hour or 12 cubic feet (corrected) per day. The back end of the tubular axle $H_{17}$ carries a worm $H_{24a}$ above which is the worm wheel $H_{25}$ of 48 teeth which therefore turns in the opposite direction to the integrator drum but at the same rate of one turn per day. Thus it will be seen that with all three worms right-handed the several worm wheels are all driven in the directions desired. As to the ratios of gearing these may be varied according to special requirements; those mentioned are those which I have chosen for general convenience. The worm wheel $H_{25}$ is fast on a long sleeve $H_{26}$ which runs freely on a fixed axle $H_{27}$ carried by a bracket $H_{28}$ with a projecting lug $H_{29}$ which forms a bearing or support for the cross-shaft $H_{15}$. At the end of the axle $H_{27}$ a wing nut $H_{29a}$ is screwed on tight to form an abutment so that the worm wheel $H_{25}$ and its sleeve may turn freely but without end-long shaking. Around the sleeve $H_{26}$ is a second sleeve $H_{30}$ split with saw cuts $H_{31}$ and sprung in at the cuts so as to form a friction drive and the second sleeve $H_{30}$ carries a concentric tube $H_{32}$ which forms the drum on which the record paper is carried under the pen. The drum carries a number of driving studs $H_{33}$, for instance, six in number which enter holes in the recording paper $H_{34}$ (Figures 3 and 19) so as to guide and drive it. The paper is divided as required but I have shown in Figure 19 a portion of the paper ruled in a manner that is generally convenient. Longitudinally there are a series of equi-distant parallel lines every fifth being darker and every tenth still darker. The middle line represents the position of the pen when indicating that the gas is of the declared value while each line to the right represents a fall of value of 1% and each line to the left a gain of value of 1%. These lines are crossed by curved lines ruled to a radius equal to that of the long arm of the pen lever. These are spaced so that 24 pass in one turn of the drum or one per hour and every sixth passes through one of the holes provided for the studs $H_{33}$. Such record when torn off and read with what was the lower part placed to the left gives a natural indication of time from left to right and high values for the gas above and low values below. If a different scale of magnification is desired such e. g. as double or half this may be effected by halving or doubling the short arm of the pen lever as already explained. Or if the record is to be one of actual value irrespective of any declared value the middle line is taken as representing some particular value e. g. 400 British thermal units per cubic foot (corrected) and each line to the right e. g. 10 units below the value and each line to the left e. g. 10 units above this value so that in such case the record would include values from 200 to 600 or it might be preferred to give it more magnification and a smaller range e. g. from 300 to 500. According to the values desired the scale of magnification is adjusted by means of the screw $T_{36}$ and link as already described and the position of the pen on the paper by means of the screw $T_{28}$ and thus the desired record will be obtained. The paper is placed in the instrument in the form of a roll $H_{35}$ resting in the trough $H_{36}$ carried on the side of the calorimeter tower CC whereby a convenient degree of friction is obtained so as to keep the paper firmly on the drum. The free end of the paper hanging from the front of the drum is conveniently clipped by means of a weighted clip so as about to balance the friction in the trough. A slit $H_{37}$ is provided in the shelf or table on which the calorimeter tower with all the mechanism attached is carried so that the paper and clip may pass therethorugh. It will be evident from the description of the clock-face and drum and worm construction that when new paper is placed on the drum its position under the pen may be adjusted so as to make the recording pen mark on a line corresponding with the time shown on the clock-face simply by turning the drum on its frictionally driving inner sleeve. Also that if thereafter the hands should be set the drum will move in accordance with the movements of the hands and always keep accurately with them but that neither setting of the hands or of the drum will in the least affect the movement of the integrator drum or integrator wheel all of which results are most desirable.

The meter drum $M_1$ of peculiar construction to be described later runs loosely and freely on the screwed axle $M_2$ so that when there is any relative rotation between them the drum moves longitudinally on the axle. The axle $M_2$ passes through a hole in the casing itself or in a bush $M_3$ in the casing $M_4$ and the casing is divided horizontally below the water level into two parts which may be bolted or screwed together. I prefer a transparent cover made for instance of celluloid or of glass so that the meter drum may be under observation when working. The axle $M_2$ is provided with a shoulder $M_5$ preventing movement outwards while the boss of the water wheel forms an abutment preventing it from moving inwards so that the axle is free to turn without end-long shaking. The front end is unsupported as shown but this is not a necessary feature. The meter axle is in line with the escapement wheel arbor $H_4$ of the clock being connected thereto by means of a flexible or elastic connection $H_5$ and driven by the water wheel as already described. The meter casing $M_4$ rests on a water tray $M_7$ (Figure 4) on the shelf and cantilever $M_8$ fastened to the back of the calorimeter tower CC and it is held down on to these by a bolt $M_9$ passing through a larger hole in the shelf so that it may be adjusted in position and clamped there by a wing nut $M_{10}$. The meter drum $M_1$ is designed to have the following properties. It offers no measurable resistance to the flow of gas at the rate of flow for which it is designed. The gas passing capacity follows a simple law, its variation in actual volume being in fact proportional to the changes in a certain angle made by the water level with a certain plane in the drum at the moment that a charge of gas is trapped, the angle being such that its trigonometrical sine varies as the water level varies. The water level is automatically corrected so that the actual volume of the gas passed at each revolution is proportional to the volume of gas at the temperature and pressure of the moment and saturated with water vapour, and thus the meter measures gas corrected for volume. If the meter drum is turning at a rate different from that of its axle it moves endwise and in doing so acts through a reducing lever on an inlet valve at which the gas enters the mantle on the front of the drum in such manner that if the drum is moving faster than the clock-governed axle the valve is gradually closed and vice versa. Thus without any other governor the gas is delivered from the meter at the exact rate intended after correction for volume and the hands of the clock showing correct time indicate that this is so. A counter might, if desired, be actuated by the cross-shaft $H_{15}$ (Figure 1), four turns of which as shown in the drawings, correspond with 1 cubic foot of gas (corrected). In order to make the construction of the drum and the theory of its action more intelligible, I have shown in Figures 10, A to K, a number of views of the drum in part or as a whole.

The Figures $10^A$ to $10^G$ show views of the meter drum in whole or in part from the axial direction while the Figures $10^H$, $10^J$, $10^K$, show transverse views in whole or in part. The side view $10^H$ shows the six levels $a$ to $f$ which correspond with the six part views $10^A$ to $10^F$ while $10^G$ is a view with part cut away of the whole. This large number of views is necessary for a clear explanation of the construction for though the drum is very easily made, the usual three views would not be sufficient to make its construction clear. Figure $10^A$ shows the back plate ($a$ of Figure $10^H$) only. Figures $10^B$ shows this plate $a$ with the part $b$ in position upon it but in section on the line $b\ b$. Figure $10^C$ shows the plate $c$ of Figure $10^H$ only while Figure $10^D$ shows the part $d$ in position upon it but in section on the line $d\ d$. Figure $10^E$ shows the plate $e$, Figure $10^H$ in full lines with some of the part $d$ seen through it in dotted lines. Figure $10^F$ is the mantle $f$ of Figure $10^H$. Figure $10^G$ is a front view of the whole drum with the mantle in part cut away. Figure $10^H$ is a view of $10^G$ from the right, $10^J$ is a view of $10^G$ from below with the mantle in section, while $10^K$ is a transverse sectional view from the same aspect as that from which $10^J$ is taken. From these drawings it will be seen that the drum consists of a pair of two-part measuring drums, one on either side of the central plate, $10^C$, but turned, one relatively to the other—through a right angle. It will also be seen by reference to Figure $10^B$ or $10^D$ that each gas containing space is bounded by a concentric arc of a circle and two arcs of a circle of larger radius symmetrically situated, that is referring to the upper half of $10^B$ the arc on the left is struck with the top point of the gas exit gap on the right as centre and the other three arcs are struck to arcs from centres symmetrically situated. The effect of this construction is made clear by the geometrical Figure $10^L$ where C is the centre of the drum, A B D L the four points from which the arcs E B, H A and the corresponding pair, not shown, below are struck, while the arc H K E is concentric with C. Two circles are drawn about C as centre one passing through the point F in A B and the other through the point G, in A E, C F being less than the smallest possible depth of water above the axis of the meter drum while C G is equal to or greater than the greatest possible depth above this axis, then if the drum is rotating in the direction shown by the arrow M, the immersion of the point A which is the highest corner of the inlet orifice on the face of the disc $e$, Figure $10^E$ or $10^H$ determines the moment and amount of gas trapped in the space above the water level which runs from the point A to some point in the arc E B depending on the depth of water. There is a certain definite volume equal to the area A H K E multiplied by the thickness of the gas space and in addition there is the volume represented by the area E A$^\times$ if A$^\times$ is the variable water level. Now if the radius A E is called $r$ and the circular measure of the angle E A$^\times$, $\Theta$; then according to ordinary measuration the area A E$^\times = \frac{1}{2} r^2 \Theta$ and therefore the change of area and hence of volume is directly proportional to the change in this angle. Again considering the right angled triangles A G C, A F C or any intermediate ones it will be seen that C F or C G or corresponding intermediate line divided by A C is equal to the trigonometrical sine of the angle D A F, D A G or intermediate angle which angle becomes less as the angle $\Theta$ becomes greater; also that these lines C, F, C G etc. are the depth of water above the axle. Hence the water depth varies as the sine of the angle D A F etc. varies and the change of gas capacity varies in simple proportion to the change in this angle and the simple relations sought for are exactly attained. The symmetrical curve at A H similar to that at E B is required for a different reason. When the point A is immersed a certain quantity of gas is trapped in the space above the water. If the water level is low, the gas is liberated at the orifice at B after very slight rotation of the drum but if the water level is high as at G then the drum must rotate until H comes down to the water level before the rising of the orifice at B liberates the gas and if during this rotation the volume of the gas space changed appreciably the drum would not move with perfect freedom but would give rise to differences of water level thus interfering with the regular flow of gas. I have found that the symmetrical curve A H is that which most perfectly fulfils this last condition when all possible variations of water level are taken into account. It will be seen therefore that with the form of drum described, the two conditions are realized that the variation of gas capacity follows a simple sine law in relation to water level which is that most easily adapted to automatic correction and the meter works without obstruction or variations of pressure whereby a governor after the meter becomes unnecessary.

Referring now to the Figures $10^A$ to $10^K$ the details of construction will, now that the principles of action are explained, be easily understood. The plate in Figure $10^A$ shows merely the boss $M_{14}$ and central hole $M_{15}$. $10^B$ shows the diametrical inclined partitions $M_{16}$ and peripheral walls $M_{17}$ curved as described above and the gas outlets $M_{18}$. It also shows two curved distance pieces $M_{19}$ inoperative as to gas passage but serving only to maintain the distance between the plates $a$ and $c$, Figure $10^H$. $10^B$ also shows the two buttresses $M_{20}$ which steady the free edge of the diametrical partition before it is cemented in place. $10^C$ shows the central orifice $M_{21}$ always immersed in water and the two gas inlet openings $M_{22}$ for the gas spaces of $10^B$.

$10^D$ corresponds to $10^B$ being of the same form turned a right angle but the buttresses $M_{23}$ appear different as the other halves of these are shown and there are in this Figure the gas-ways $M_{24}$ which lead gas from the orifices $M_{28}$ in E through the gas space of $10^D$ to the gas inlet openings $M_{22}$ in $10^C$. The plate shown in $10^E$ is provided with a central boss $M_{27}$ with tapped hole $M_{26}$ and the four gas inlet passages, the two $M_{28}$ leading through $M_{24}$ to the back compartments and the two $M_{29}$ leading to the front compartments. The mantle $10^F$ is that common in wet gas meters. Its central opening $M_{30}$ is always immersed and the gas to be measured is led into the space between the mantle and the drum face $e$ and above the water by a pipe to be described immediately.

It will be seen in Figure $10^G$ that the buttresses $M_{20}$ $M_{23}$ abut on the central plate $10^C$ one above the other and so stiffen the whole construction. I have found transparent celluloid to be a most convenient material for the construction of the drum.

Referring now to Figures 11 to 14, $M_{31}$ is the lever which controls the gas passage through the nipple $M_{32}$. The lever $M_{31}$ is pressed very lightly away from said nipple by a spring, not shown in the Figures, but its free end is pressed by the boss $M_{27}$ on the front plate $e$ of the meter drum when in consequence of differential rotation this has moved forward on the axle. Such pressure overcomes the light spring and brings the lever more nearly into contact with the nipple $M_{32}$ thus reducing the flow of gas. The nipple $M_{32}$ is near the end of the turned-up pipe $M_{33}$ which is carried by the casting $R_1$ which forms the foundation on which the regulating tap to be described later is constructed. From what has been said it will be evident that this pipe $M_{33}$ passes under water through the opening $M_{30}$ in the mantle and delivers gas therein above the water level.

The meter drum is contained within a casing in which the lower part is a casting $M_4$ and the upper part is a transparent cover $M_{34}$ held down by the rectangular annulus $M_{35}$ pinching the flange $M_{36}$ of the cover between itself and the flanged casting $M_4$. Screws $M_{37}$ make the joint tight. As already explained, this joint is below the water level so if there should be any leakage it will be water and not metered gas that escapes. Gas leaves the meter by the tube $M_{38}$ passing down through the shelf on which everything is carried and so by the india-rubber tube $M_{39}$ to the burner tube $C_{21}$. The waste water from the water tray $M_7$ passes down by the tube $M_{40}$ and so goes to the general drain $M_{41}$.

Although in the example of construction described above the meter is rotated by buckets supplied with water which does not traverse the calorimeter, I may, if desired, utilize, for supplying the water wheel buckets, water which has previously passed through the calorimeter, i. e. subsequently to its discharge from the pipe $C_{27}$. This alternative merely necessitates the disposal of the meter water wheel and connected elements at a level below that of the termination of the pipe $C_{27}$.

Having now shown how the water level must vary with temperature and pressure in order that the meter may measure and pass the same actual quantity of gas at each turn, I can next show how this variation of level is brought about. $V_1$ (Figure 4) is a bell made of glass held in the wooden clamp $V_2$ pinched upon it by screw $V_3$ and nut $V_4$ so that by loosening the nut the bell $V_1$ can be raised or lowered. The upper end communicates through a tube $V_5$ with a stopcock $V_6$ so that the tube may either be closed hermetically or connected with a small funnel $V_7$ open to the air. The bell is cylindrical and is open below. This end is closed by the mercury bath $V_8$ which, to economise mercury, is made with a hollow or "kick" $V_9$ nearly up to the mercury level. The edge of the bell dips into the narrow annular space around the "kick" and some water $V_{10}$ is allowed to float on the mercury. Thus a certain volume of air saturated with water vapour is trapped in the bell above the mercury and the quantity of air can be altered by opening the stopcock and moving the bath one way or the other. The funnel $V_7$ is convenient for the insertion of water. The mercury bath—most easily made of celluloid—hangs in a swivel ring $V_{11}$ resting on pins $V_{12}$ in a pair of notches $V_{13}$ in a crutch $V_{14}$ carried on the end of the lever arm $V_{15}$ which turns with its pin $V_{16}$ in a hole in the side of the meter casing and enters the water of the meter. Beyond the lever is continued so as to carry the balance weight $V_{17}$ with its instability bob $V_{18}$ the two being adjustable in position, the weight $V_{17}$ being clamped to the lever $V_{15}$ by the screw $V_{18a}$ on which the instability bob $V_{18}$ may be screwed up or down to adjust the instability as will be explained. The balance weight is so placed that when the stopcock $V_6$ is open to the air the bath is balanced. As, however, the greater or less immersion of the bell in the mercury acts as a stability, i. e. if balanced in a certain position it will be in strong stable equilibrium there; this is the same as saying that if the bell is more immersed owing to a rise of the bath and the stopcock closed, the air in the bell is under slightly diminished pressure and under greater presure when less immersed. Such variation of pressure would affect the volume of the gas in the bell. In order to prevent this the instability bob $V_{18}$ is provided, its action being in the opposite sense to that due to the stability caused by immersion and if adjusted in height, equal thereto. If, therefore, both the counterweight and the stability bob are correctly adjusted, the mercury bath will be in sensibly neutral equilibrium whether the bell is immersed more or less. The volume of the air trapped in the bell is then that due to air saturated with water vapour and at the temperature and pressure of the moment and the position of the mercury bath $V_8$ as indicated by a pointer $V_{19}$ in conjunction with a scale of gas volume $V_{20}$ on the front of the calorimeter tower C C enables an observer to observe that the bell has attained its correct position by comparing the scale indication with a table of gas volumes for saturated gas. The scale of gas volume $V_{20}$ is capable of adjustment and clamping by means of the nut $V_{21}$. As the whole angle moved by the lever arm $V_{15}$ for any usual changes of temperature and pressure is very small, the angle and its sine are equivalent and the angle moved by the lever from its mean position either way is proportional to the variation either way of the gas volume. Within the meter casing a curved lever $V_{22}$ is secured to the pin which is fastened to the lever outside by the action of a pinching screw (not shown) acting on a flat on the pin thus ensuring that the lever $V_{22}$ is tipped up to the correct angle as required by the theory of the meter. This angle is equal to D A x if A x is taken about half-way between A B and A E. The lever $V_{22}$ is bent so as not to foul the meter axle or bush and the distance to the pivot hole $V_{25}$ from the axis of the pin is exactly equal to the radius A C, Figure $10^L$. It follows from this construction that the pivot hole $V_{25}$ follows the sine law of change of level demanded by the theory of the meter for the change of water level so that it is merely necessary to keep the water level at a certain constant distance above the pivot hole $V_{25}$. I effect this as follows:—

I allow a constant very small supply of water to pass by the pipe $X_3$ into the meter casing preferably in the neighbourhood of the pivot hole $V_{25}$. I effect this by causing the lever $W_{13}$ which, as elsewhere described, makes a small excursion for every turn of the water wheel to move a small cup $W_{28}$, with open tubular stem $W_{29}$ having a capacity of a few drops of water only into the line of water delivery from the pipe $W_{12}$, which supplies water to the water wheel buckets $H_3$. Then on the return of said lever to its waiting position the stem $W_{29}$ of the cup is brought into contact with the end of the tube $X_3$ whence by capillarity the contained water is discharged into the meter. In this way a definite small supply of water, more than sufficient to make up leakage, is delivered into the meter so that the water level would very slowly rise if other means of escape were not provided. Pivoted to the lever $V_{22}$ at the pivot hole $V_{25}$ is the bar $V_{26}$ carrying at its upper end the capillary siphon $V_{27}$ and a weight $V_{28}$ at its lower end so that it always hangs vertically. The short leg of the siphon terminates at a point $V_{29}$ at such a distance above the pivot hole $V_{25}$ as to be equal to the designed depth of immersion of that pivot hole. The long leg of the siphon hangs freely within the tube $V_{30}$ which reaches above the highest level of the water and communicates through a lug in the meter casing with the outlet pipe $V_{31}$.

From the description above it will be clear that if the siphon can run off the water faster than it comes in from the feeding device the level will vary according to the size of the angle law demanded by the theory of the meter and the quantity of gas delivered at each revolution will be always the same in spite of variations of temperature and pressure. The water which falls from the water wheel and any which may leak past the axle of the meter and past the axle of the lever $V_{15}$ or which may leak through the joint at the top of the meter casing is all caught in the water tray $M_7$ from which it escapes through an outlet pipe $M_{40}$. In order that the mouth of the bell $V_1$ may not touch the sides of the mercury bath the meter casing is made adjustable in position to a small extent as already described; thus on loosening the nut $M_{10}$ the casing may be moved so as to bring the mercury bath truly concentric with the bell and be fixed in that position by tightening the nut $M_{10}$. The flexible connection $H_5$ permits of this movement and it also relieves the escapement teeth of the impact that would be caused by sudden stoppage of the water wheel at every tick of the clock.

If the water surface within the meter were quiescent, the contact of the water with the short end of the siphon would not be made until the water had risen to that level. On the other hand as the general water level falls in consequence of the siphon discharge, capillarity causes a delay in the converse operation and the general level falls a very small fraction of an inch before the capillary connection is broken. This can actually be seen to happen through the transparent cover if the meter drum is not in place and the alternate very small rise and fall of the water level occurs every few minutes. This would in no way affect the accuracy of the instrument during its continuous operation, but it would be a disturbing feature during the meter testing operation. The agitation of the water, however, caused by the rotation of of the meter drum causes a constant small local variation of level of about the same extent as the capillary elevation, and thus the contact due to this is constantly being broken in such manner as to maintain a steady mean level with quick instead of slow succession of activity of the capillary siphon. This agitation may be controlled by a screen $V_{31}$ (Figure 1).

It will be evident from a consideration of the action of the curved lever $V_{22}$ and capillary siphon that an equivalent construction might alternatively be employed, for example, as follows:—A meter casing mounted on trunnions concentric with the meter axle and itself tilted more or less by direct attachment to the lever $V_{15}$ could be employed instead of the curved lever $V_{22}$, and in such case the interior surface of the transparent or other cover would be concentric with the meter axle, and the capillary siphon would be fixed within the meter casing with the end of its short leg at a distance from the meter axis equal to the radius C A of Fig. 10. In so far as the water level in relation to the meter axis is concerned, such an arrangement is exactly equivalent to the method already described. Such a modification has the advantage that the moving lever $V_{22}$ and pivoted bar $V_{26}$ are not required, but in their place trunnion supports and flexible connections for the gas entry and exit would have to be provided. For these reasons I have described in detail the arrangement which appears to me to be preferable.

Having now described the construction of my new recording calorimeter, and the principles and method of operation, I have next to show how the accuracy of its indications may be verified, so that the means of adjustment where necessary may be utilized to correct inaccurate results, and the whole record may be directly referred to standard capacity vessels duly certified as correct and standard thermometers and barometer.

In order to check the water supply to the calorimeter, a water measuring vessel $A_1$ (Fig. 19) made of clear glass is provided hanging from a hook $A_2$ below the shelf or table on which the calorimeter tower CC is supported. The calorimeter water discharge after being led down in front of the calorimeter tower by the pipe $C_{27}$ is led off to the left under said shelf to either one of two positions. Normally in working to the drain head $A_3$ as shown by dotted lines whence it passes to the general drain—either to go to waste or where preferred to a tank, so that it may be used again. When a test is to be made, the pipe leading the water to the first drain head $A_3$ is diverted into the position shown in full lines (Figure 20), so that it enters the measuring vessel $A_1$. I have shown this of such a capacity as to be suitable for measuring the water run from the calorimeter in five minutes, i. e., in ten tips of the measuring vessel W. The pipe, therefore, is moved over to the full line position at the moment that the vessel $W_1$ tips, and it is moved back in five minutes at the moment when the vessel makes the tenth tip after the diversion of the water stream. The vessel is divided so that a scale of values 300 to 600 may be read on it, or of course other numbers to suit other units of measurement or qualities of gas. The capacity of the measuring vessel is such that at the division 540 it contains exactly 20 ounces of water, this being the amount of water which gas having a calorific value of 540 British thermal units per cubic foot (corrected) will heat 10° C. if one twenty-fourth of a cubic foot of it under standard conditions is burned and all the heat of combustion is transferred to the water. The volumes corresponding to the other divisions are in simple proportion, so that if gas of any declared calorific value between 300 and 600 is being tested, and the reading shown by the water is that of the declared value, then the rise of temperature will be 10° C., an amount chosen to facilitate the testing of the operative thermometers. With more extreme calorific values, more or fewer tips may be employed. If then the water reading is the declared value of the gas, the water measuring vessel is giving the desired supply; if not, the screw head $W_{20}$ is turned one way or the other to adjust the water capacity of the measuring vessel until a correct reading is obtained, after which it is locked by the lock nut $W_{21}$. In the other use of the recording calorimeter which is to keep a record of the calorific value of gas not as percentage departures from some declared value, but in plain values, the operator may choose the rise of temperature which is to correspond to a particular calorific value, e. g., 10° C. rise for gas of 400 calorific value of any gas, will be forty times the number of degrees of rise of temperature as measured with a centigrade thermometer. These are chosen in preference to Fahrenheit thermometers as being more easily obtained of accurate construction. If then the user determines that the four inches or forty divisions of the record sheet shall cover the range from 200 to 600, and outside this he requires no record, then the rise of temperature for these extremes will be 5° C. and 15° C. respectively, and twenty divisions on the sheet will correspond to 5° C., or each division represents one quarter of a degree centigrade. He will therefore see that the ten tips of the water measuring vessel fill the vessel to the 400 mark, and with the proper scale of magnification of the thermometer lever obtained as already described the calorimeter will give the desired record, each division representing ten units as well as one quarter of a degree.

In order to check the gas meter, a clear glass gas measuring vessel $G_1$ is provided resting on a seat $G_2$ cut in the shelf on which everything is carried. This vessel $G_1$ is connected above by an indiarubber tube (not shown) with the tube $G_4$ leading from the testing tap M attached to the meter. The lower end of the vessel $G_1$ is closed by a cork $G_5$ and tube $G_6$, which tube is connected by a loop of indiarubber tube (not shown) with the lower end of the vessel $G_7$ (Figure 17) also made of clear glass. There is a mark $G_8$ (Figure 19) round the neck of the vessel $G_1$ so much above the top of the tube $G_6$ that when all the water is run out that can be, the water level is indicated by said mark. This part of the gas bottle is taken from the design of the one twelfth of a cubic foot, measure made by the late Mr. A. Vernon Harcourt. The gas measuring vessel is divided with a scale on its upper and reduced part reading from .92 about to 1.15, these being the extreme gas volumes under ordinary changes of temperature and pressure for which it is necessary to provide. Since in Figure 17 the vessel $G_1$ is shown in section, and the scale on the front cannot be shown in position, but this is drawn in the space to the left of the figure. The volume at the reading 1.00 is one-twenty-fourth of a cubic foot. If the gas bottle is filled with gas and discharged as will be described through the meter, and the connection cut off by the tap M, at the moment that the meter drum seen through its transparent cover has made ten turns exactly (as indicated by the passage of a conspicuous mark upon the drum behind a mark on the cover) then if the water has entered the gas vessel $G_1$ up to the mark that corresponds with the gas volume at the time as taken from the tables of gas volumes and comparison with thermometer and barometer, the meter is acting correctly. If, however, there is a difference, the meter capacity must be altered until the volume determined as described is found to be correct. The method by which the alteration is effected is most easily indicated by an example. If the gas volume at the time is 1.05, and the water reading on the vessel $G_1$ is 1.08, the meter capacity must be reduced nearly 3%. The nut $V_{21}$ holding the scale $V_{20}$ must be loosened, and the scale shifted if necessary until the pointer $V_{19}$ is over the mark 1.08, and there be clamped. The nut $V_4$ is then loosened so that the air bell $V_1$ is free, and this must be moved upwards until the pointer $V_{19}$ has moved from the mark 1.08 to the mark 1.05. Then when sufficient time has elapsed for the water level in the meter casing to assume its new level, which will be apparent from the renewed operation of the capillary siphon $V_{27}$ or the escape of water from the tube $V_{31}$ the meter should be measuring correctly, and this may be proved by a repetition of the test with the gas bottle $G_1$. The scale $V_{20}$ is to be used as a convenient means for obtaining a correct setting, but not as a means for proving that the setting is correct, for which the use of the gas bottle is imperative. If the air in the bell $V_1$ is more in volume than it should be as determined by the geometry of the meter drum and magnification of the lever $V_{15}$, the effect will be a slight exaggeration of the correction for extremes of volume, and vice versa, and tests made on such occasions will show if this is the case. Small corrections of volume can be made by holding the pointer $V_{19}$ against the mark which it indicates, and then opening the tap $V_6$, after which the pointer may be moved a small amount so as to alter the air content of the bell as desired, and the stop-cock $V_6$ closed again, but this adjustment is one which, after the first setting up, should be required still less than the other.

The casting $R_1$ (Figures 13 and 14) is made with a flange $R_2$ to bolt onto the side of the meter casing $M_4$ by means of the screws $R_3$ (Figures 11 and 12). Figure 11 is a front view with the operating plate to be described removed, and showing therefore the five small holes $R_4$, $R_5$, $R_6$, $R_7$ and $R_8$, which by the aid of the operating plate control the movement of the gas. The gas is brought from the gas supply to the pipe $R_9$, which by means of a drilled hole $R_{10}$, shown dotted in Figure 11, brings live gas to the holes $R_4$ and $R_5$. The flow of gas through these holes is controlled by the position of the operating plate $R_{10a}$ which is centred on a bolt $R_{11}$ with head $R_{12}$ and nut $R_{13}$, and held up against the truly flat face of the casting $R_1$ by means of the spring $R_{14}$ compressed between the head $R_{12}$ and the casting $R_1$. As seen in Figures 16 and 15, which latter shows the back of the operating plate there are two concentric passages $R_{15}$ and $R_{16}$ cut on its surface so as to connect such of the holes $R_4$ to $R_8$ as may be desired. The front of the operating plate is seen in Figure 16 in the position necessary for the ordinary working of the calorimeter. From this and from Figures 11 and 12 it will be seen that the passage $R_{15}$ connects the holes $R_5$ and $R_6$, the latter communicating by means of the drilled hole $R_{17}$ and pipe $M_{33}$ with the nipple $M_{32}$ and the mantle space of the meter drum. The position of the operating plate is indicated by the mark labelled G. M. being opposite the index $R_{18}$ carried by the casting $R_1$, thus indicating that the gas and meter only are connected. The same comparison of figures will show that the holes $R_4$ and $R_7$ are covered by the operating plate $R_{10a}$, while the hole $R_8$ is in communication with the passage $R_{16}$ which for this position is a dead one. When it is desired to fill the gas bottle $G_1$ with gas, the operating plate is turned in the clockwise direction until the mark labelled G. M. B. is opposite the index $R_{18}$. In this position the holes $R_5$, $R_6$, $R_7$, the last communicating with the pipe $G_4$ and gas bottle $G_1$, are connected by the passage $R_{15}$. At the same time the passage $R_{16}$ is just about connecting the holes $R_4$ and $R_8$. If now the water vessel $G_7$ suspended by the cord $G_9$ is lowered, so that the water $G_1$ can pass into it gas will enter the vessel $G_1$, and ultimately fill it down to the mark $G_8$. It will be evident from the drawings that the cord $G_9$ which has passed over a pulley overhead (not shown) is wound or unwound from the winch $G_{10}$ (Figure 18) operated by the handle $G_{11}$, and arrested at any point by the ratchet $G_{12}$ and pawl $G_{13}$, by which means the operator has complete control of the position of the water vessel $G_7$. Even though gas is passing into the gas bottle $G_1$, the supply to the meter being still open, gas also passes as before to the meter. If now the operating plate $R_{10a}$ is turned to the next mark labelled M. B., the meter and gas bottle will still remain connected, but the gas supply to the meter inlet will now be cut off. Immediately the gas in the gas bottle $G_1$ which had been under the gas supply pressure will fall to atmospheric pressure, and unless provision were made to prevent it, the gas flame at the burners would go out. In order to prevent this, the passage $R_{16}$ is provided, and this brings the holes $R_4$ and $R_8$ into communication before the passage $R_{15}$ leaves the gas supply at $R_5$. $R_4$ is also a gas supply, and thus gas is provided to pass by the outlet pipe $R_{19}$ (Figure 17), and so by the union $R_{20}$ through the fine tube $R_{21}$, to the pipe $M_{38}$ which leads gas from the meter to the burner. The tube $R_{21}$ has so restricted a bore that the gas which can pass to the burner under the full pressure of supply is not much more than that which is necessary to keep it alight, and the pressure of efflux is practically inappreciable. The operating plate is used also to bring the meter drum into the position at which the conspicuous marks on the drum and cover already described are in line. This is done simply by working it between the positions G. M. B. and M. B., until the meter drum is at rest in that position. Having now the gas bottle charged with gas at atmospheric pressure, and the meter drum in position ready to start a test, the water vessel $G_7$ is raised by the winch and the gas allowed to pass through the meter. The meter drum is then watched and at the tenth passage of the conspicuous mark, the operating plate $R_{10a}$ is turned to the position D, when $R_4$ and $R_8$ remain connected, but all other connections are dead. The actual gas volume passed is then read on the scale on the gas bottle $G_1$ and compared with the tabular gas volume at the time as described herein.

It is not necessary to stop the clock during these operations, as the process is so quick that the drum need not be screwed along the axle more than a very small amount. The process of testing, however, is certain to leave a kink in the record on the paper, which is a desired feature for such kink will indicate that a test has been made and, where the recording calorimeter is being used for official tests, this kink should be signed by the operator, thus showing that he has complied with the requirements as to testing, and no test can be made without discovery. The amount of error introduced thereby into the integrated result is inappreciable. As soon as a test is complete, the operating plate is turned to G. M. position, and the normal working continued.

In order to check the operative thermometer system and degree of magnification of the record in the recording paper, standard mercurial thermometers are inserted in the cold water above the cold bulb $T_1$, and in the pocket $T_9$ in the hot bulb $T_5$, so that their stems are visible above the lid of the calorimeter tower CC, adjacent to one another and with the mercury in each at about the same level. If the record sheet is being used to indicate percentage departures from a declared value, and 10° C. is the rise adopted for gas of the declared value, whatever that value may be, then if the difference of temperature as read on the mercurial thermometers differs by as many tenths of a degree centigrade as the pen is recording percentage error, + or − as the case may be, the indication is correct. Or if the record paper is used in the other manner to indicate calorific value in plain figures, then following the figures in the example already given, if the difference of temperature of the mercurial thermometers is above or below 10° C. by an amount which is one-quarter of the number of divisions above or below the 400 line, the instrument is recording correctly, but if in either of these cases the pen is recording in a different position, it must be corrected. The pen can be moved to the proper place by moving the screw $T_{28}$ as required, but if in tests made at the extremes of the scale on the paper the range of movement is found to be too large or too small, this error is corrected by altering the scale of magnification by means of the screw $T_{36}$ turned in such a direction as to lengthen the short arm of the thermometer lever if the movement is too great, or to shorten it if too small.

Having now found without stopping the working of the calorimeter that the water and gas are being measured correctly, and that the operative thermometers are recording correctly, the record of the calorimeter may be taken as correct.

Having now described my invention what I claim as new and desire to secure by Letters Patent is:—

1. Apparatus for controlling the flow of liquid through a flow gas calorimeter including in combination a tipping vessel, trunnion pins, curved bearing surfaces thereon and horizontal plane supporting surfaces for said pins along which said curved bearing surfaces may roll during tipping of said vessel (to discharge its contents) with friction due to such rolling motion only in contradistinction from sliding motion.

2. Apparatus for controlling the flow of liquid through a flow gas calorimeter including in combination a tipping vessel supported on a substantially horizontal axis, the centre of gravity of the vessel when empty lying behind a vertical plane through this axis and the centre of gravity when the vessel contains a predetermined quantity of liquid lying in said plane and above the axis, liquid supply means so disposed that when the vessel is tipped the stream from said liquid supply means flows clear thereof but is trapped by the vessel when the latter is empty and until the latter is supplied with the said predetermined quantity of liquid, means retaining the vessel in its tipped position for at least the duration of discharge of liquid therefrom, a clock-governed movement and tripping means for releasing said retaining means actuated by power under control of said clock-governed movement.

3. The inclusion in a flow gas calorimeter wherein water driving mechanism is provided and a water supply is controlled by a tipping vessel, of a perforated water box receiving the incoming water when the vessel is tipped, and of means conveying water from said water box to the said driving mechanism of the calorimeter.

4. A flow gas calorimeter including a combustion chamber, a hot thermometer bulb, a container surrounding said combustion chamber and said hot thermometer bulb, a highly conducting shield surrounding part of said container, heat insulating means between said shield and said container, and a thermal connection between said shield and the upper end only of said container.

5. A flow gas calorimeter including a readily removable and replaceable combustion chamber and combustion gas circuit, a poorly heat conducting case, a coiled conduit therein and surrounding a container adapted to convey circulating fluid, insulation round said container, means for conveying air for combustion between said heat insulated container and said case in contact with the exterior of said coiled conduit, thus bringing the air for combustion and the circulating fluid to the same temperature without saturating the air with water vapour.

6. A flow gas calorimeter including a combustion chamber, a hot thermometer bulb, a container surrounding said combustion chamber and said hot thermometer bulb, a highly conducting shield surrounding part of said container and connected thereto at its upper end only, a poorly heat conducting case, a coiled conduit therein surrounding said container and adapted to convey said circulating fluid, heat insulating material around said container, air being conveyed between said heat insulated container and the said case in contact with the exterior of said coiled conduit for combustion thus unifying the temperature of the air for combustion and of the circulating fluid without saturating the air with water vapor.

7. A flow gas calorimeter including a readily removable and replaceable combustion chamber and combustion gas circuit, a hot thermometer bulb, a container surrounding said combustion chamber and said hot thermometer bulb, a highly conducting shield surrounding part of said container and connected thereto, a poorly heat conducting case, a coiled conduit therein surrounding said container, insulation round said container and a space around said heat insulated container adapted to convey air in contact with the exterior of said coiled conduit for combustion, thus unifying the temperature of the air for combustion and of the circulating fluid without saturating the air with water vapor.

8. A gas calorimeter including gas flow governing apparatus, time-controlled apparatus and common driving means therefor, which means comprise a source of constant power.

9. A gas calorimeter including gas flow governing apparatus, time-controlled apparatus and common driving means therefor, which means comprise water driven motor mechanism.

10. A recording gas calorimeter, including gas flow governing mechanism and time-controlled apparatus incorporating a pendulum controlled pallet, co-operating with an escapement wheel to which is applied a source of constant power.

11. A gas calorimeter, including rate of water flow controlling mechanism, gas flow governing mechanism and common driving means for said two mechanisms, said means comprising a source of constant power.

12. A gas calorimeter, including rate of water flow controlling mechanism, gas flow governing mechanism, integrating mechanism and common driving means for said three mechanisms, said means comprising a source of constant power.

In testimony whereof I have signed my name to this specification.

CHARLES VERNON BOYS.